Feb. 7, 1939.　　　H. C. LOCKWOOD　　　2,145,937
WELDING AND WELDED JOINT
Filed Feb. 12, 1935　　　3 Sheets-Sheet 1
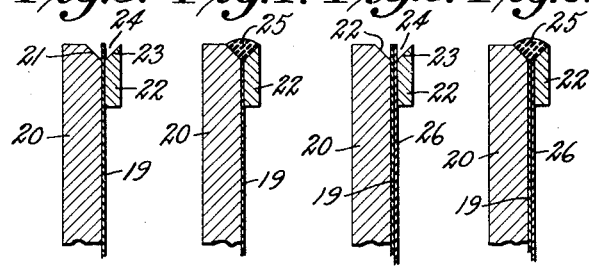
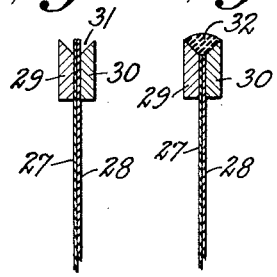 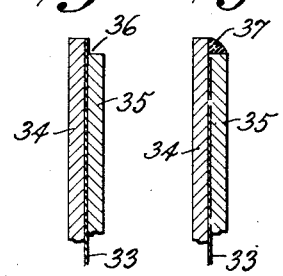 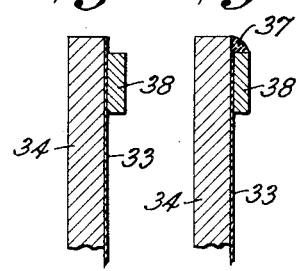
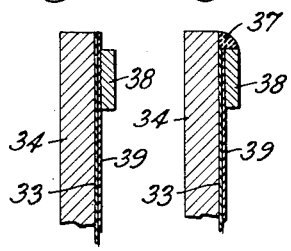 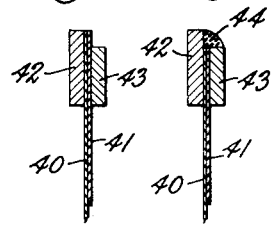 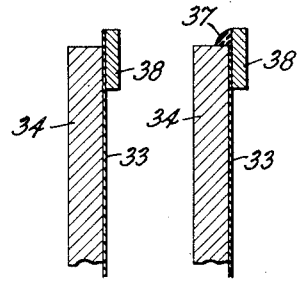
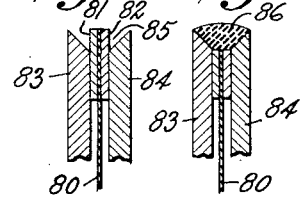 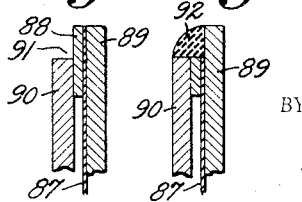
INVENTOR.
HENRY C. LOCKWOOD
BY
ATTORNEY.

Feb. 7, 1939. H. C. LOCKWOOD 2,145,937
WELDING AND WELDED JOINT
Filed Feb. 12, 1935 3 Sheets-Sheet 2
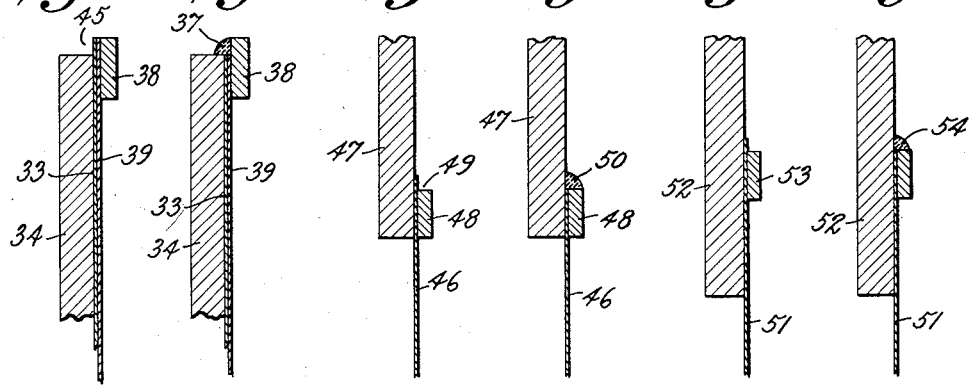
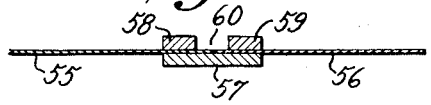
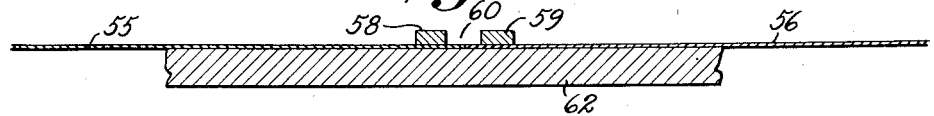
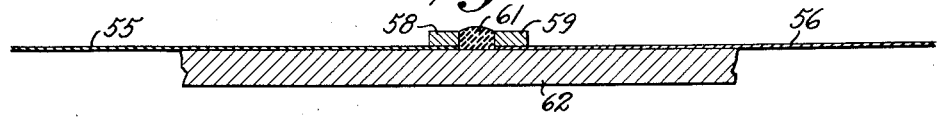
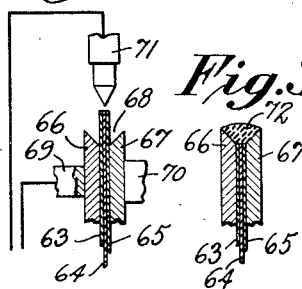
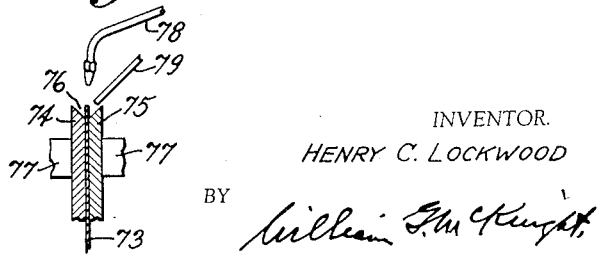
INVENTOR.
HENRY C. LOCKWOOD
BY
ATTORNEY.

Feb. 7, 1939.  H. C. LOCKWOOD  2,145,937
WELDING AND WELDED JOINT
Filed Feb. 12, 1935   3 Sheets-Sheet 3
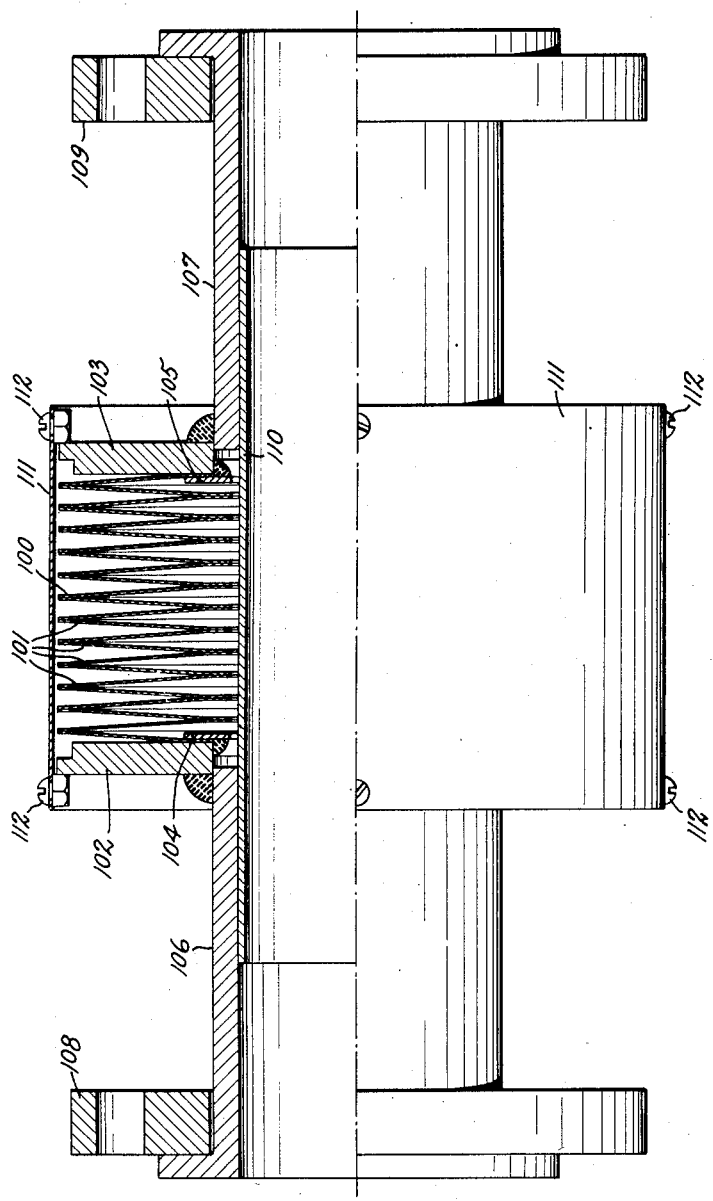
INVENTOR.
HENRY C. LOCKWOOD
BY
ATTORNEY.

Patented Feb. 7, 1939

2,145,937

UNITED STATES PATENT OFFICE 2,145,937

WELDING AND WELDED JOINT

Henry C. Lockwood, Brooklyn, N. Y.; Isabel Tyte Lockwood, administratrix of said Henry C. Lockwood, deceased Application February 12, 1935, Serial No. 6,140

14 Claims. (Cl. 113—112)

This invention relates to welding and to welded joints.

The invention provides novel methods of welding thin gauge metal plates or parts to other metallic plates or parts of any thickness to produce novel welded joints having great mechanical strength and pressure tightness.

In the fabrication of articles or structures employing thin gauge sheet metal, it is often desirable to weld sections of thin metal to each other or to heavier gauge metal sections in various combinations. In all such cases, mechanical strength of the welded joints is requisite and in many cases fluid pressure tightness is also necessary. With thin gauges of metal, the slightest application of welding heat, in attempts at welding, melts the heated parts almost instantly and the molten metal flows away from the source of heat like water. The overheated portion of the thin sheets nearest the heat source disappears and is lost through vaporization; the balance of the melted portion flows backwards and "balls up" on the receded edge. The thin sheets are insecurely stuck together here and there on a ragged edge but no true, dependable weld is obtained and if the sheets are followed up in an attempt to secure a better weld, the metal disappears from in front of the advancing source of welding heat indefinitely. This is especially true with electric arc welding since the thin sheets must carry the welding current and since the heat application is more intense in electric welding. Welding of thin gauge sheets has thus heretofore been a failure first because it has been impossible to produce anything but a burned, irregular series of tack welds and second because it has been impossible to obtain position control, i. e., to place the weld where and only where wanted. In attempts to weld thin gauge metal to heavier gauge metal, much greater difficulties are encountered because of the effect of differences in mass upon heat application. With electric arc welding, the minimum thickness of metal sheet which can be successfully welded to a sheet of equal thickness is about $\frac{1}{16}$" and with gas welding, the minimum thickness is about $\frac{1}{32}$" but with both of these methods of welding and with these thicknesses of metal, the welds are accomplished with difficulty and the results are not wholly satisfactory. At best, the welds are uneven and the sheets become greatly distorted.

In accordance with the present invention, thin metal sheets of any gauge may be readily welded to other metal sheets or pieces of any thickness to provide welded joints of great mechanical strength and fluid pressure tightness.

The invention will be understood from the following description considered in connection with the accompanying drawings showing numerous welded joints embodying the invention and also illustrating the methods of welding these joints.

In the drawings:

Fig. 1 is a partial sectional view illustrating one method of welding a thin plate between two heavier plates;

Fig. 2 is a partial sectional view of the finished joint;

Figs. 3 to 28 inclusive illustrate methods of welding one or more thin plates to one or more heavier plates and for welding thin plates together in accordance with the invention. In this group of figures, the odd numbered figures illustrate the positions of the parts for the joints prior to welding, and the next higher even numbered figures show the finished welded joint in each instance;

Fig. 29 illustrates a method of welding a plurality of thin plates to heavier plates without the deposition of extraneous metal;

Fig. 30 is a partial sectional view of the finished joint welded by the method illustrated in Fig. 29;

Fig. 31 is a view similar to Fig. 1 illustrating the method of welding a thin plate to heavier plates by gas welding;

Figs. 32 to 35 inclusive illustrate another method of welding thin plates to heavier plates; and Fig. 36 is a longitudinal view, half in section and half in elevation, showing an expansion joint having welded joints produced in accordance with the invention.

Like characters of reference refer to like or similar parts throughout the several views.

The method employed utilizes the fact that metal plates or parts of thin gauge readily melt upon the application thereto of welding heat. When thin plates are to be welded together, means are provided for limiting the thin plate volume that is heated and melted and such means also function to limit the movement or flow of the resulting molten metal bead so that the bead will be confined to the desired welding zone and when permitted to cool, the plates will be welded exactly where desired. Where one or more thin plates are to be welded to one or more thicker plates, the thin plate or plates are first positioned with respect to the thick plate or plates so that a controlled portion of the thin plate or plates may be melted in the desired zone of weld. The thick plates will provide a welding groove and serve to restrict the extent to which the thin plates are melted and welded and will also restrict the movement and fix the position of the resulting molten bead. Where only one thick plate is to be welded to a thin plate or plates, additional means are utilized for these purposes. In some instances, a sufficient volume of the thin plate or plates may be melted to provide an adequate welding bead, but in other instances, the deposition of extraneous metal will be necessary to supplement the welding bead produced by the melting of the thin plates. Simultaneous to the time the exposed portions of the thin plate or plates are in the molten state, the surfaces of the thick plates to which they are to be welded, or, as the case may be, the surfaces of the means employed for limiting the extent of melting of the thin plates, are also brought to molten condition in the welding zone, so that upon cooling, all parts are united in a common, integral weld.

Referring to Figs. 1 and 2, a thin metal plate 10 is welded at one end intermediate two thick plates 11 and 12. In this instance the electric arc method of welding is employed. The thin plate 10 is first placed between the thick plates 11 and 12 with their upper ends substantially in alignment. The upper edges of the thick plates are preferably bevelled to provide a V-shaped reservoir or pocket designated 13 which may also be considered as the welding zone. The upper edges of the thick plates in the welding zone may, however, be in alignment or substantially in alignment, if desired. It will be observed that the upper end portion of the thin plate 10 projects into this welding zone. The plates are clamped together in the position shown by any suitable means and grounded to one side of a welding circuit. The welding rod 16, connected to the other side of the welding circuit through its holder and cable, is then preferably applied to the bevelled side of one of the heavy plates somewhat removed from the projecting thin plates 10. This prevents the welding current from passing through the unprotected portion of thin plate. The spot on the surface of the bevel of the heavy plate to which the welding rod has been applied melts and the molten bead runs down and engulfs the projecting portion of the thin plate, which is thereby melted by indirect heat application and, without burning or other detriment, joins and becomes an integral part of the welding bead. By this method, the thin plate 10 enters the welding bead without any separation therefrom. The arc is then carried over the thin plate, which is now well protected by a heavy welding bead, to the opposite bevelled side of the other heavy plate and the weld completed for the first pass. The welding bead is then progressed in similar fashion by running the arc back and forth until the length of the weld is completed. One bead usually suffices, but a second bead may readily be superposed over the first since the thin plate is thoroughly protected by the first bead. The weld thus produced possesses great mechanical strength and is fluid pressure tight.

Figs. 3 and 4 illustrate the method of welding a thin plate to a single heavy plate and the resulting welded joint, respectively. The thin plate 19 is placed in contact with the heavy plate 20 with their upper ends in approximate alignment. The upper edge of the plate 20 adjacent the thin plate 19 is preferably bevelled as indicated at 21 and this bevelled surface together with what will be termed a "welding strip" or "welding piece" 22 having its upper edge preferably bevelled as indicated at 23, form a pocket, reservoir or groove 24 for the resulting welding bead. The welding strip 22 should be of sufficiently heavy gauge metal so that it will not be melted excessively upon the application of the welding heat and should extend in a direction normal to the upper edge of the thin plate 19 a sufficient distance to provide a satisfactory joint for the purpose intended. As in the production of the joint illustrated in Figs. 1 and 2, the upper end of the thin plate is melted preferably by the indirect application of the heat of a molten welding bead formed on one side on a heavy plate and advanced to the thin plate and thereafter carried to the opposite heavy plate, thereby uniting without separation thin plate 19, with the bevelled surfaces 21 and 23 of the heavy plate 20 and welding strip 22 respectively, to provide a joint of great mechanical strength and fluid pressure tightness.

The joint shown in Figs. 5 and 6 is similar to the joint shown in Fig. 4 with the exception that two thin plates are welded to a heavy plate. The second thin plate is designated 26 and is welded at its upper end to the adjacent thin plate 19 and to the heavy plate 20.

In Figs. 7 and 8 two thin plates 27 and 28 are welded together at their upper ends in accordance with the invention. Two welding strips 29 and 30 are placed in contact with the upper portions of the opposed outside faces of the thin plates 27 and 28 and the upper edges of the welding strips are preferably bevelled to provide a pocket 31. The welding bead 32 produced by the melting of the upper ends of the thin plates and the extraneous metal unites with the molten bevelled surfaces of the welding strips to unite securely the upper ends of the thin plates.

Figs. 9 and 10 illustrate another method by which a thin plate 33 may be welded between two heavier plates 34 and 35. In this instance the upper end of the thin plate is positioned flush with the upper end of one of the heavy plates, as 34, and the upper end of the other heavy plate 35 is positioned a suitable distance below the upper ends of the other plates to provide a pocket 36 which functions like the pocket 13 in Fig. 1. With this method, the plates 34 and 35 restrict the extent to which the upper end of the thin plate 33 is melted upon the application of the welding heat as heretofore described and further restrict the movement of the welding bead and confine it to the pocket 36. The bead 37 produced by the melting of the upper end of the thin plate and the melted portion of the welding rod unites with the molten surfaces of the plates 34 and 35 which define the pocket 36 to weld the plates together upon cooling of the bead.

The same method is employed to weld a thin plate to a single heavy plate as illustrated in Figs. 11 and 12. In lieu of the plate 35 a welding strip 38 is employed with its upper edge positioned a suitable distance below the upper ends of the plates 33 and 34. The same method may be employed to weld two thin plates to a single heavy plate as illustrated in Figs. 13 and 14. The additional heavy plate is designated 39.

The same method may be employed to weld two thin plates together as illustrated in Figs. 15 and 16. The thin plates 40 and 41 are placed together with their upper ends in alignment and a welding strip 42 is placed in contact with the upper surface of plate 40 and with its upper edge in alignment with the upper ends of the thin plates. A second welding strip 43 is placed in contact with the outer surface of plate 41 and with its upper edge disposed a suitable distance below the upper ends of the thin plates. The solidification upon cooling of the resulting welding bead 44 securely welds the plates together to provide a pressure tight joint of great strength.

The joint shown in Figs. 17 and 18 is the reverse of the joint shown in Figs. 11 and 12 in that the upper edge of the thin plate 33 is disposed above the upper end of the thick plate 34 and the welding strip 36 is placed with its upper edge flush with the upper end of the thin plate. The resulting bead 37 upon cooling securely welds the parts together.

The joint shown in Figs. 19 and 20 is the reverse of the joint shown in Figs. 13 and 14 in that the upper edge of the welding strip 36 is disposed in alignment with the upper ends of the thin plates 33 and the upper edge of the thick plate 34 is disposed below the upper edges of the thin plates to provide a pocket 45. The cooling of the resulting bead 37 securely welds the thin plates to the thick plate and to the welding strip 36.

As shown in Figs. 21 and 22 a thin plate is welded to an intermediate portion of a thick plate to provide a so-called lap joint. The thin plate 46 and the heavy plate 47 are placed in contact in overlapping relationship as shown and a welding strip 48 is placed in contact with the thin plate 46 with its upper edge disposed a suitable distance below the upper edge of the thin plate to provide a pocket or reservoir 49. The welding heat will melt the upper end portion of the thin plate which projects above the upper edge of the welding strip 48 and will also cause the deposition of metal from the welding rod and simultaneously will cause the surface of the plate 47 and welding strip 48 which define the pocket 49 to become molten to a slight depth and the cooling of the resulting welding bead 50 will unite the thin plate to the thick plate and to the welding strip.

The same method is employed to weld the joints shown in Figs. 23 and 24 wherein the thin plate 51 is welded at a different position to the thick plate 52 by the aid of the welding strip 53. The resulting bead 54 upon cooling unites the several parts to provide a pressure tight joint of great strength.

Figs. 25 and 26 illustrate the method of butt welding two thin plates. The thin plates 55 and 56 are placed in abutting relationhip, a welding strip 57 is placed in contact with the plates so as to overlap the abutting ends of the two plates and welding strips 58 and 59 are placed in contact with the other faces of the plates in spaced relationship to each other and to the abutting ends of the two plates as shown. The adjacent edges of the strips 58 and 59 together with the upper surfaces of the welding strip 57 define a pocket or reservoir 60 which receives the welding bead produced and restricts it to the welding zone. It will be understood that the welding strips further limit the extent to which the thin plates are melted upon the application of the welding heat. The parts are clamped in the position shown in Fig. 25, one of the electrodes is brought into contact with welding strip 57 and the other electrode with the welding current applied is brought into contact with the abutting ends of the thin plates. The heat produced melts the end portions of the thin plates which project into the pocket 60 and also causes the deposition of metal from the welding rod and simultaneously melts the surface of the welding strips 57, 58 and 59 which define the pocket 60. The bead 61 resulting unites with the thin plates and the welding strips and upon cooling provides a pressure tight and strong welded joint.

The same method substantially is employed to weld two thin plates in abutting relationship to a single heavy plate as shown in Figs. 27 and 28. The heavy plate 62 is substituted for the welding strip 57 so that the resulting bead 61 unites the thin plates to the heavy plate 62 as in the case with the joint shown in Fig. 26.

In the production of the welded joints heretofore described, the welding bead has been composed of metal melted from the adjacent surfaces of the heavy plates, metal melted from the thin plate or plates and metal melted from the welding rod. However, it will be understood that the invention is not limited to this specific method but that welded joints embodying the invention may be produced without the deposition of extraneous metal by providing a sufficient volume of metal which may be melted from the surfaces of the heavy plates and the thin plates to provide an adequate welding bead for the joint desired. It will be understood that this method is applicable to the production of all joints herein disclosed. This method and the resulting joint is illustrated in Figs. 29 and 30. In these figures three thin paltes 63, 64 and 65 are placed together with their upper edges in alignment as shown. These thin plates are to be welded between two heavy plates 66 and 67 which preferably have their upper edges bevelled in reverse directions to provide a pocket or reservoir 68. The upper edges of the thin plates are placed a sufficient distance above the upper edges of the heavy plates 66 and 67 so that the melting of the volume of metal which projects through and above the pocket 68 in conjunction with the volume of metal melted from the heavy plates will provide a welding bead of the desired volume of metal. The plates are all clamped in the position shown by an electrode 69 and a cooperating clamping plate 70 or other suitable means. Employing a nondepositing electrode, such as carbon, the pocket 68 is sealed over by manipulating the electrode rod as heretofore set forth whereby the thin plates are incorporated in the welding bead and a continuous and pressure tight joint is formed. The cooling of the bead 72 provides a strong pressure tight joint between the thin plates and the welding strips as shown in Fig. 3.

In the production of the welded joints heretofore described, the welding heat has been produced by the electric arc method of welding. It will be understood however that the welding heat may be produced by other methods, such as by gas or chemical action. The gas welding method is illustrated in Fig. 31 to produce a joint of the type shown in Figs. 1 and 2. With this method the thin plate 73 is to be welded between two heavy plates 74 and 75 which preferably have their upper edges bevelled to provide a pocket 76. The upper end of the thin plate 73 projects into the pocket 76 as heretofore described in connection with the joints shown in Figs. 1 and 2. The thin and thick plates are clamped together in the position shown by suitable clamping means 77 and the welding heat is supplied by means of gas discharged from a welding torch or other suitable device 78. The welding method with gas is preferably carried out by procedure equivalent to the procedure followed in electric arc welding. The heating jet from the welding torch is applied to the bevelled surface of one of the heavy plates at a point somewhat removed from the projecting thin plate, thus protecting the thin plate from the direct application of the intense heat from the torch. After this spot on the bevelled surface of the heavy plate has been brought to a molten condition, the welding rod is introduced and a molten bead built up. This molten bead is then run over the projecting portion of the thin plate which is engulfed, melted and absorbed thereby. The jet from the torch thus far has been applied on the bead on the side away from the thin plate, so as to protect the latter. After the thin plate has been melted and absorbed by the bead, it is protected and the welding jet is then moved over the bead to the opposite grooved surface of the other heavy plate, which is then melted and joined to the common bead. The same procedure is carried on, back and forth, until the desired length of weld has been completed. The bead resulting from the melting of the bevelled surfaces of the heavy plates and the upper end of the thin plate and the deposition of the metal from the welding rod 79 unites with the molten bevelled surface of the heavy plates and the thin plate and upon cooling provides a strong pressure tight joint. Satisfactory results can be obtained by applying welding heat directly to the thin plate or plates, either in electric arc or gas welding, but the protective procedure as heretofore described is preferred.

It will be understood that the invention is not limited to the particular types of joint disclosed since the methods of the present invention are applicable to the production of a wide variety of welded joints comprising thin plates or one or more thin plates and one or more heavier or heavy plates. Since those portions of the thin plates which are disposed in or project into the welding zone are melted in producing the welded joints of this invention, it will be perceived that there is no limit with respect to the thinness of plates or metal pieces which may be welded in accordance with these methods. In other words, thin plates of any gauge may be readily welded to other thin plates of any gauge or may be welded to another or other relatively heavy plates or metal pieces of any gauge.

Figs. 32 to 35 inclusive illustrate a variation in the welding methods heretofore disclosed. As indicated in these figures, one or more protective strips, preferably about 1/16" in thickness, are utilized and are placed in contact with the thin plates in such position as to isolate and protect the portion thereof in the welding zone. This method is particularly useful when the welding is done with an electric arc but is also advantageous with gas or chemical action welding. With the thin plate or plates clamped firmly in the welding zone between two protective plates or one protective plate and a heavy plate, the thin plates, so protected, function exactly like a heavy plate and may be readily welded. In this case, the welding heat may be applied directly to the protected portion of the thin plates in the welding zone in either electric arc or gas welding. If desired, however, the method of first building up a bead on one side of the protected projecting portion of the thin plate or plates and then carrying said bead to and over the projecting portion to the other heavy plate as heretofore described may be employed. In some instances, better welds are obtained by this protective plate method.

The method illustrated in Figs. 32 and 33 is similar to that employed to make the joint shown in Figs. 1 and 2, except that protective strips 81 and 82 are disposed on opposite sides of and in contact with the upper portion of the thin plate 80, with the upper edges of the thin plate and the protective strips in alignment with each other and with the upper bevelled ends of the heavier plates 83 and 84 respectively. With the parts securely clamped in the position shown in Fig. 32, the portion of the thin plate extending in the welding zone protected by and clamped between heavier plates assumes the properties of a heavy plate and the combination functions as a unit. Welding heat is then applied by an electric arc or by a gas torch or other means to melt the portions of the thin plate 80 and the protective strips 81 and 82 which project into the welding zone and also the surfaces of the bevelled upper ends of the heavier plates 83 and 84 and the cooling of the resulting bead 86 unites all parts as shown in Fig. 33. Extraneous metal may or may not be deposited, as required. If arc welding is employed, the electrodes should be so positioned that the thin plate does not conduct the welding current. In other words, the electrode is brought into contact with one of the protective strips and the welding heat thus generated is transmitted to the thin plate by conduction, the combination functioning as a unit.

As illustrated in Figs. 34 and 35, a joint is produced which, except for the protective strip, is similar to the joint shown in Figs. 9 and 10. The protective strip 88 is placed in contact with one face of the upper portion of the thin plate 87 in alignment with the upper end of the latter and with the upper end of the heavier plate 89 which is in contact with the other face of the thin plate. The other heavier plate 90 is placed in contact with the protective strip and has its upper end placed below the upper end of the protective strip to provide a welding zone or pocket 91. The welding heat generated by the arc or gas, melts the portions of the thin plate and protective strip which are in the welding zone 91 and also melts the surfaces of those portions of the heavier plates 89 and 90 which define the welding zone and upon cooling of the bead 92, the several parts are firmly united as shown in Fig. 35, thereby producing a strong and fluid pressure tight joint.

It will be understood that the protective strips may be used in the manner suggested, for the production of any of the joints disclosed in Figs. 1 to 30 inclusive as well as to other joints.

The methods herein disclosed effectively weld stainless steel plates to each other or to one or more heavier plates of stainless or carbon steel.

The method of welding thin plates to heavier plates herein disclosed may be utilized in the production of expansion joints of my invention, particularly in the securement of the expansible and contractible members to heavy terminal plates. This expansion joint is shown in Fig. 36. The expansible and contractible member or bellows designated generally 100 consists of a plurality of thin flat circular plates 101 which are centrally apertured and concentrically disposed, with each plate being electric seam welded adjacent its outer periphery to the adjacent plate disposed on one side and electric seam welded adjacent its inner periphery to the adjacent plate disposed on the other side. This type of bellows including a method of fabricating it and an expansion joint including such bellows is disclosed in my Patent No. 2,084,496, granted June 22, 1937. The outermost plates 101 are welded in accordance with the method herein disclosed to heavy gauge terminal plates 102 and

103 respectively. The particular method employed is that illustrated in Figs. 17 and 18. Stainless steel plates 0.018" thick are satisfactory for the bellows. Annular welding strips 104 and 105 are utilized in welding the inner peripheral portions of the outermost plates 101 to the heavy terminal plates 102 and 103 respectively. Terminal plates 102 and 103 are welded to Van Stone necks 106 and 107 respectively, which have loose ring flanges 108 and 109 respectively, for securing the joint into a line or otherwise. The joint is provided with an internal sleeve and alignment guide 110 which is welded at one end to the inner cylindrical portion of one of the Van Stone necks, as 107, and with an external sleeve and limit stop 111 having a plurality of stops 112 in its end portions, which in this instance consist of nuts and bolts. Any suitable form of joint herein disclosed may be utilized for the joint between the outermost plates 101 and the terminal plates 102 and 103 in lieu of the particular joints shown in Fig. 36. In lieu of the nuts and bolts 112, the end portions of the sleeve 111 may be turned to provide an inwardly directed flange which will engage the terminal plates 102 and 103.

Expansion joints fabricated in this manner are strong and durable and are permanently fluid pressure tight. These joints are fabricated from a small number of parts and the outside diameters of the joints are reduced to a minimum. For example with joints 6" and below, the outside diameter need be only about ¼" greater than the diameter of the flanges of the joints, except for the very small joints and with joints 8" and above, the outside diameter may be no greater or even less than the diameters of the flanges employed. The economy of manufacture possible with these expansion joints will be readily apparent.

It will be understood that no intention is entertained to limit the invention except by the scope of the appended claims.

What I claim is:

1. The method of welding a thin gauge metallic piece to a heavier gauge metallic piece which comprises placing the pieces in welding position with a protective strip of heavier gauge metal than the thin piece disposed so as to protect the thin piece from direct application of welding heat, applying welding heat to the protective strip to melt a portion of the protective strip in the desired zone of weld and to melt a portion of the thin piece in said zone by heat conducted from the protective strip to the thin strip, incorporating said melted portions in an adequate welding bead while maintaining integral relationship between the thin piece and the protective strip and the welding bead, and uniting in integral relationship the bead and the heavier piece and the protective strip.

2. The method of welding a thin gauge metallic piece to a heavier gauge metallic piece which comprises placing the pieces in welding position with a protective strip of heavier gauge metal than the thin piece disposed in contact with the thin piece in the desired zone of weld, applying welding heat to the protective strip to melt a portion of the protective strip in the desired zone of weld and to simultaneously melt a portion of the thin piece in said zone by heat conducted from the protective strip to the thin strip, incorporating the melted portions in an adequate welding bead while maintaining integral relationship between the thin piece and the protective strip and the welding bead, and uniting in integral relationship the bead and the heavier piece and the protective strip.

3. The method of welding a thin gauge metallic piece to a heavier gauge metallic piece which comprises placing the pieces in welding position with one face of the thin piece in contact with the heavier piece and with a protective strip of heavier gauge metal than the thin piece in contact with the other face of the thin piece in the desired zone of weld, melting a portion of the protective strip and a portion of the thin piece in the desired zone of weld, incorporating the melted portions in an adequate welding bead while maintaining integral relationship between the thin piece and the protective strip and the welding bead, and uniting in integral relationship the bead and the heavier piece and the protective strip.

4. The method of welding a thin gauge, ordinarily unweldable, metallic piece to a heavier gauge ordinarily weldable metallic piece which comprises placing the pieces in welding position with one or more protectve strips of metal of ordinarily weldable gauge disposed in contact with the thin piece in the desired zone of weld, melting a portion of said one or more protective strips and a portion of the thin piece in the desired zone of weld, incorporating the melted portions in an adequate welding bead while maintaining integral relationship between the thin piece and the protective strip and the welding bead, and uniting in integral relationship the bead and the heavier piece and the protective strip.

5. An article of manufacture including a thin gauge metallic piece welded to a plurality of heavier gauge metallic pieces and to one or more protective strips of heavier gauge metal than the thin piece, the heavier gauge pieces being disposed with respect to the thin piece and to each other to define a welding groove and to form a reservoir for a welding bead and each protective strip being disposed intermediate the thin gauge piece and a heavier gauge piece.

6. The method of welding a thin gauge metallic piece of less than 1/16 inch thickness to another metallic piece of heavier gauge which comprises placing the thin piece with a peripheral portion in welding relationshp with the heavier piece, placing another metallic piece of heavier gauge than the thin piece in welding relationship with said peripheral portion of the latter, corresponding end portions of the heavier pieces being oppositely disposed with respect to the thin piece and defining a welding groove at least one surface of which is disposed at an angle less than an obtuse angle to a face of the thin gauge piece, the peripheral portion of the thin gauge piece projecting into said groove above said angularly disposed surface, melting substantially the entire portion of the thin piece projecting into said groove and bringing to molten condition the surfaces of the heavier pieces defining said welding groove in the areas adjacent those portions of the thin piece to which welding heat is applied and permitting said melted and molten portions to cool to unite in integral relationship the thin and heavier gauge pieces.

7. The method of welding a plurality of thin gauge metallic pieces to a metallic piece of heavier gauge which comprises placing the thin pieces with their peripheral portions in welding relationship with the heavier piece, placing another metallic piece of heavier gauge than the thin pieces in welding relationship with said peripheral portions of the latter, corresponding end portions of the heavier pieces being oppositely disposed with respect to the thin pieces and defining a welding groove at least one surface of which is disposed at an angle less than an obtuse angle to a face of at least one of the thin gauge pieces, the peripheral portions of the thin gauge pieces projecting into said groove above said angularly disposed surface, melting the portions of the thin pieces projecting into said groove and bringing to molten condition the surfaces of the heavier pieces defining said welding groove in the areas adjacent those portions of the thin pieces to which welding heat is applied and permitting said melted and molten portions to cool to unite in integral relationship the thin and heavier gauge pieces.

8. The method of welding together thin gauge metallic pieces which comprises placing the thin pieces with their peripheral portions in welding relationship with two metallic pieces of heavier gauge oppositely disposed with respect to the thin pieces, corresponding end portions of the heavier pieces defining a welding groove at least one surface of which is disposed at an angle less than an obtuse angle to the faces of the thin gauge pieces, the peripheral portions of the thin gauge pieces projecting into said groove above said angularly disposed surface, melting the portion of the thin pieces projecting into said groove and bringing to molten condition the surfaces of the heavier pieces defining said welding groove in the areas adjacent those portions of the thin pieces to which welding heat is applied and permitting said melted and molten portions to cool to unite in integral relationship the thin and heavier gauge pieces.

9. The method of butt welding thin gauge metallic pieces which comprises placing the thin gauge pieces in welding position with their ends contiguous and above a heavier gauge metallic piece extending under the contiguous end portions of the thin pieces, placing a heavier gauge metallic piece above each thin gauge piece in spaced relationship with the end thereof to be welded, said heavier gauge pieces defining a welding groove into which the contiguous ends of the thin pieces project, melting the contiguous end portions of the thin gauge pieces disposed in the welding groove and bringing to molten condition the surfaces of the heavier gauge pieces which define the welding groove and permitting said melted and molten portions to cool to unite in integral relationship the thin and heavier gauge pieces.

10. The method of welding a thin gauge metallic piece to another metallic piece of heavier gauge which comprises placing the thin piece with a peripheral portion in welding relationship with the heavier piece, placing another metallic piece of heavier gauge than the thin piece in welding relationship with said peripheral portion of the latter, corresponding end portions of the heavier pieces being oppositely disposed with respect to the thin piece and defining a welding groove at least one surface of which is disposed at an angle less than an obtuse angle to a face of the thin gauge piece, the end portion of the thin gauge piece projecting into said groove above said angularly disposed surface, placing a protective strip of heavier gauge metal than the thin gauge piece in such position as to protect the thin piece from direct application of welding heat, applying welding heat to the protective strip to melt the portion of the protective strip disposed in the welding groove and the portion of the thin piece disposed in the groove by heat conducted from the protective strip to the thin piece, and applying welding heat to bring to molten condition the surfaces of the heavier pieces which define the welding groove in the areas adjacent those portions of the thin piece being melted, and permitting said melted and molten portions to cool to unite in integral relationship the thin and heavier gauge pieces and the protective strip.

11. The method of welding a plurality of thin gauge metallic pieces to another metallic piece of heavier gauge which comprises placing the thin pieces with their peripheral portions in welding relationship with the heavier piece, placing another metallic piece of heavier gauge than the thin pieces in welding relationship with said peripheral portions of the latter, carresponding end portions of the heavier pieces being oppositely disposed with respect to the thin pieces and defining a welding groove at least one surface of which is disposed at an angle less than an obtuse angle to the faces of the thin gauge pieces, the end portion of the thin gauge pieces projecting into said groove above said angularly disposed surface, placing a protective strip of heavier gauge metal than the thin gauge pieces in such position as to protect the thin pieces from direct application of welding heat, applying welding heat to the protective strip to melt the portion of the protective strip disposed in the welding groove and the portions of the thin pieces disposed in the groove by heat conducted from the protective strip to the thin pieces, and applying welding heat to bring to molten condition the surfaces of the heavier pieces which define the welding groove in the areas adjacent those portions of the thin pieces being melted, and permitting said melted and molten portions to cool to unite in integral relationship the thin and heavier gauge pieces and the protective strip.

12. The method of welding a thin gauge metallic piece to another metallic piece of heavier gauge which comprises placing the thin piece with a peripheral portion in welding relationship with the heavier piece, placing another metallic piece of heavier gauge than the thin piece in welding relationship with said peripheral portion of the latter, corresponding end portions of the heavier pieces being oppositely disposed with respect to the thin piece and defining a welding groove at least one surface of whch is disposed at approximately a right angle to a face of the thin gauge piece, the peripheral portion of the thin gauge pieces projecting into said groove above said angularly disposed surface, placing a protective strip of heavier gauge metal than the thin gauge piece in such position as to protect the thin piece from direct application of welding heat, applying welding heat to the protective strip to melt the portion of the protective strip disposed in the welding groove and the portion of the thin piece disposed in the groove by heat conducted from the protective strip to the thin piece, and applying welding heat to bring to molten condition the surfaces of the heavier pieces which define the welding groove in the areas adjacent those portions of the thin piece being melted, and permitting said melted and molten portions to cool to unite in integral relationship the thin and heavier gauge pieces and the protective strip.

13. An article of manufacture including a thin gauge plate of less than $\frac{1}{16}$ inch thickness integrally united to a heavier gauge plate disposed on one side of the thin plate and to another heavier gauge plate disposed on the other side thereof, corresponding end portions of the heavier gauge plates defining a welding groove at least one surface of which is disposed at an angle less than an obtuse angle to a face of the thin gauge plate, the thin plate being positioned relative to the heavier gauge plates so that prior to being united thereto, a peripheral portion of the thin plate projected into said groove above said angularly disposed surface, all of said plates being integrally united by a welding bead consisting at least in part of substantially the entire portion of the thin plate which projected into said groove.

14. An article of manufacture including a plurality of thin gauge plates each of less than $\frac{1}{16}$ inch thickness integrally united to a heavier gauge plate disposed on one side of the thin plates and to another heavier gauge plate disposed on the other side thereof, corresponding end portions of the heavier gauge plates defining a welding groove at least one surface of which is disposed at an angle less than an obtuse angle to a face of one of the thin gauge plates, the thin plates being positioned relative to the heavier gauge plates so that prior to being united thereto, peripheral portions of each of the thin plates projected into said groove above said angularly disposed surface, all of said plates being integrally united by a welding bead consisting of at least in part of substantially the entire portion of each of the thin plates which projected into said groove.

HENRY C. LOCKWOOD.